(12) United States Patent
Hwang et al.

(10) Patent No.: US 9,019,200 B2
(45) Date of Patent: Apr. 28, 2015

(54) METHOD FOR DRIVING AN ELECTRO-WETTING DISPLAY PANEL AND ELECTRO-WETTING DISPLAY APPARATUS FOR PERFORMING THE SAME

(71) Applicant: Liquavista B. V., Eindhoven (NL)

(72) Inventors: Hyun-Sik Hwang, Ansan-si (KR); Uk-Chul Choi, Cheonan-si (KR); Su-Hyeong Park, Gyeongju-si (KR); Cheol-Woo Park, Suwon-si (KR); Ji-Myoung Seo, Daegu (KR); Yong-Jun Jang, Yongin-si (KR)

(73) Assignee: Amazon Technologies, Inc., Reno, NV (US)

( * ) Notice: Subject to any disclaimer, the term of this patent is extended or adjusted under 35 U.S.C. 154(b) by 201 days.

(21) Appl. No.: 13/674,318

(22) Filed: Nov. 12, 2012

(65) Prior Publication Data

US 2013/0127817 A1    May 23, 2013

(30) Foreign Application Priority Data

Nov. 22, 2011    (KR) .................. 10-2011-0121984

(51) Int. Cl.
*G09G 3/34* (2006.01)
*G09G 3/00* (2006.01)
*G02B 26/00* (2006.01)

(52) U.S. Cl.
CPC .............. *G09G 3/001* (2013.01); *G02B 26/005* (2013.01); *G09G 3/348* (2013.01); *G09G 2300/08* (2013.01); *G09G 2310/063* (2013.01); *G09G 2320/0673* (2013.01)

(58) Field of Classification Search
None
See application file for complete search history.

(56) References Cited

U.S. PATENT DOCUMENTS

| 2009/0289968 A1* | 11/2009 | Yoshida ........................ 345/691 |
| 2011/0205259 A1* | 8/2011 | Hagood, IV .................. 345/690 |
| 2012/0106238 A1* | 5/2012 | John et al. ..................... 365/154 |

FOREIGN PATENT DOCUMENTS

| JP | 1987-043624 | 2/1987 |
| JP | 2005-227475 | 8/2005 |
| JP | 2010-204665 | 9/2010 |
| KR | 2006-0042604 | 5/2006 |

\* cited by examiner

*Primary Examiner* — Adam R Giesy
(74) *Attorney, Agent, or Firm* — Lee & Hayes, PLLC

(57) ABSTRACT

A method of driving an electro-wetting display panel including a pixel part is provided. In the method, data voltages are applied to the electro-wetting display panel during a first time of a frame. The frame has the first time and a second time. The first time has a plurality of horizontal periods. The data voltages are generated based on reference gamma voltages. At least one of reference gamma voltages of one of the horizontal periods is different from another of the reference gamma voltages of another of the horizontal periods. A reset voltage is applied to the electro-wetting display panel during the second time of the frame.

20 Claims, 11 Drawing Sheets

METHOD FOR DRIVING AN ELECTRO-WETTING DISPLAY PANEL AND ELECTRO-WETTING DISPLAY APPARATUS FOR PERFORMING THE SAME

CROSS-REFERENCE TO RELATED APPLICATION

This application claims priority under 35 U.S.C. §119 to Korean Patent Application No. 10-2011-0121984, filed on Nov. 22, 2011, the disclosure of which is hereby incorporated by reference herein in its entirety.

1. Technical Field

Example embodiments of the present invention relate to a method for driving an electro-wetting display panel and an electro-wetting display apparatus for performing the method. More particularly, example embodiments of the present invention relate to a method for driving an electro-wetting display panel using a reset voltage and an electro-wetting display apparatus for performing the method.

2. Discussion of the Related Art

Recently, an electro-wetting display apparatus (EWD) has been developed. The EWD may include aqueous liquid and non-aqueous liquid disposed in a pixel. In the EWD, a voltage may be applied to the aqueous liquid (e.g., water) to change a surface tension of the water, and then the non-aqueous liquid (e.g., oil) is moved to transmit light through the pixel.

The EWD may include, for example, a plurality of pixels having a plurality of pixel electrodes, water, oil, etc.

Each of the pixels may include, for example, the pixel electrode, the water and the oil. The movement of the oil may be controlled by a voltage applied to the pixel. When the oil does not move toward the partition wall according to the voltage, the pixel electrode may be covered by the oil, so that the light provided from outside is blocked, which means that the EWD displays a black state. However, when a different voltage is applied to the pixel electrode, the oil may move due to the surface tension of the water, and the pixel electrode is partially uncovered by the oil. Thus, the light provided from outside of the EWD may pass through the pixel, so that the EWD displays another state different form the black state.

However, when a constant voltage is continuously applied to the pixel electrode during at least two consecutive frames, the oil tends to return into an original state, which is called a back-flow. A reset signal having a black grayscale is applied to the display panel to prevent the oil from returning.

The application of the reset signal may increase the power consumption and heat generation of the EWD.

Also, the brightness difference between an upper portion and a lower portion of the EWD screen may increase, so that an image display quality of the EWD may be deteriorated.

SUMMARY

Example embodiments of the present invention can provide a method of driving an electro-wetting display panel uniformly displaying brightness of an upper side and a lower side of the electro-wetting display panel.

Example embodiments of the present invention can provide an electro-wetting display apparatus performing the method of driving the electro-wetting display panel.

According to an example embodiment of the present invention, a method for driving an electro-wetting display panel including a pixel part is provided. In the method, data voltages are applied to the electro-wetting display panel during a first time of a frame. The frame has the first time and a second time. The first time has a plurality of horizontal periods. The data voltages are generated based on reference gamma voltages. At least one of the reference gamma voltages of one of the horizontal periods is different from another of the reference gamma voltages of another of the horizontal periods. A reset voltage is applied to the electro-wetting display panel during the second time of the frame.

In an example embodiment, when the data voltages are applied, driving voltages may be received to generate the reference gamma voltages. The driving voltages of the horizontal periods may be different from each other. The data voltages may be applied to the pixel part based on image data and the reference gamma voltages.

In an example embodiment, the reference gamma voltages may be generated by receiving first to n-th driving voltages during first to n-th horizontal periods, respectively. The first to n-th horizontal periods correspond to first to n-th gate lines, respectively.

In an example embodiment, voltage difference between a common voltage and the first to n-th driving voltages may increase from the first to the n-th horizontal periods.

In an example embodiment, the first time may be n times longer than the second time ('n' is an integer number which is no less than 2).

According to an example embodiment of the present invention, a method of driving an electro-wetting display panel including a pixel part is provided. In the method, image data is compensated based on gamma curves which are different from each other to generate compensated data at each horizontal period. Data voltages are applied to the electro-wetting display panel based on the compensated data. A reset voltage is applied to the electro-wetting display panel.

In an example embodiment, the compensated data may be generated using first to n-th look-up tables. The look-up tables may correspond to first to n-th horizontal periods, respectively. The first to n-th horizontal periods may correspond to first to n-th gate lines, respectively. Brightness corresponding to the first to n-th look-up tables storing the compensated data is increased from the first to the n-th look-up tables.

In an example embodiment, the first look-up table may correspond to an original gamma curve of the image data. Brightness corresponding to the second to n-th look-up tables corresponding to the gamma curves may be higher than that the brightness of the original gamma curve, and the brightness corresponding to the second to n-th look-up tables may substantially linearly increase from the second to the n-th look-up tables.

According to an example embodiment of the present invention, a method of driving an electro-wetting display panel including a plurality of pixel parts controlling light transmittance by controlling movement of a fluid in each pixel part is provided. In the method, data voltages are sequentially applied to first to n-th gate lines of the electro-wetting display panel in a first direction, and the data voltages are sequentially applied to first to n-th pixel parts through the first to n-th gate lines during a first time of a frame. The first to n-th gate lines are arranged in a first direction. The frame has the first time, a second time, a third time and a fourth time. The first time has a plurality of periods. The first to n-th pixel parts are connected to the first to n-th gate lines, respectively. Reset voltages are sequentially applied to the first to n-th gate lines in the first direction and the reset voltages are sequentially applied to the first to n-th pixel parts during the second time of the frame. The data voltages are sequentially applied to the first to n-th gate lines in a second direction opposite to the first direction and the data voltages are sequentially applied to the n-th to first pixel parts during the third time of the frame. The reset voltages are sequentially applied to the first to n-th gate lines in the second direction and the reset voltages are sequentially applied to the n-th to first pixel parts during the fourth time of the frame.

In an example embodiment, the first time may be n times longer than the second time, and the third time is n times longer than the fourth time ('n' is an integer number which is no less than 3).

According to an example embodiment of the present invention, an electro-wetting display apparatus is provided. The electro-wetting display apparatus includes an electro-wetting display panel and a driving part. The electro-wetting display panel displays an image. The electro-wetting display panel includes a pixel part including a pixel electrode, a common electrode facing the pixel electrode and a fluidic layer disposed between the pixel electrode and the common electrode. The fluidic layer control light transmittance of the pixel part. The driving part applies data voltages to the electro-wetting display panel during a plurality of horizontal periods of a first time of a frame and applies a reset voltage to the electro-wetting display panel during a second time of the frame. The data voltages are generated based on reference gamma voltages. One reference gamma voltage of one horizontal period is different from another reference gamma voltage of another period. The frame has the first and second times.

In an example embodiment, the driving part may include a timing controlling part, a power generating part, a gamma voltage generating part and a data driver. The timing controlling part is configured to receive an image data from outside of the electro-wetting apparatus. The power generating part is configured to generate driving voltages at each horizontal period. Voltage differences between the common electrode and the driving voltages are different from each other in each of the horizontal periods. The gamma voltage generating part is configured to generate the reference gamma voltages different from each other based on the driving voltage during each horizontal period. The data driver is configured to generate a data voltage based on the image data and each of the reference gamma voltages during each horizontal period.

In an example embodiment, the power generating part is configured to generate first to n-th driving voltages during first to n-th horizontal periods, respectively. The first to n-th horizontal periods may correspond to first to n-th gate lines, respectively. The voltage difference between the common electrode and the first to n th driving voltages may increase as the number of the driving voltage increases from the first to the n th.

In an example embodiment, the first time may be n times longer than the second time ('n' is an integer number equal to as or more than 2).

According to an example embodiment of the present invention, an electro-wetting display apparatus includes an electro-wetting display panel and a driving part. The electro-wetting display panel displays an image. The electro-wetting display panel includes a pixel part including a pixel electrode, a common electrode facing the pixel electrode and a fluidic layer disposed between the pixel electrode and the common electrode. The fluidic layer controls light transmittance of the pixel part. The driving part compensates an image data based on gamma curves during a plurality of horizontal periods to generated compensated data, applies a data voltage to the electro-wetting display panel, and applies a reset voltage to the electrode-wetting display panel. The gamma curves of different horizontal periods are different from each other. The data voltage is generated based on the compensated data.

In an example embodiment, the driving part may include a timing controlling part generating the compensated data configured to compensate the image data based on gamma curves during the first to n-th horizontal periods to generate compensated data using first to n-th look-up tables corresponding to first to n-th horizontal periods, respectively. The first to n-th horizontal periods may correspond first to n-th gate lines, respectively. Brightness of the gamma curves corresponding to the compensated data stored in the first to n-th look-up tables may increase, as the number of the look-up tables increases from the first to the n-th.

In an example embodiment, the first look-up table may correspond to an original gamma curve of the image data. Brightness corresponding to the second to n-th look-up tables may correspond to the gamma curves higher than that the brightness of the original gamma curve, and the brightness corresponding to the second to n-th look-up tables may substantially linearly increase.

According to an example embodiment of the present invention, an electro-wetting display apparatus includes an electro-wetting display panel and a driving part. The electro-wetting display panel displays an image. The electro-wetting display panel includes a pixel part including a pixel electrode, a common electrode facing the pixel electrode and a fluidic layer disposed between the pixel electrode and the common electrode, the fluidic layer controlling light transmittance of the pixel part. The driving part sequentially applies data voltages to first to n-th gate lines of the electro-wetting display panel in a first direction to sequentially apply the data voltages to first to n-th pixel parts through the first to n-th gate lines during a first time of a frame. The first to n-th gate lines are arranged in a first direction. The frame has the first time, a second time, a third time and a fourth time. The first time has a plurality of periods. The first to n-th pixel parts are connected to the first to n-th gate lines, respectively. The driving part sequentially applies reset voltages to the first to n-th gate lines in the first direction to sequentially apply the reset voltages to the first to n-th pixel parts during the second time of the frame. The driving part sequentially applies the data voltages to the first to n-th gate lines in a second direction opposite to the first direction to sequentially apply data voltages to the n-th to first pixel parts during the third time of the frame. The driving part sequentially applies the reset voltages to the first to n-th gate lines in the second direction to sequentially apply the reset voltages to the n-th to first pixel parts during the fourth time of the frame.

In an example embodiment, the first time may be n times longer than the second time, and the third time may be n times longer than the fourth time ('n' is an integer number which is no less than 3).

According to an example embodiment of the present invention, an electro-wetting display apparatus includes an electro-wetting display panel and a driving part. The electro-wetting display panel includes a first substrate, a second substrate facing the first substrate, a fluidic layer, a first conductive spacer and a second conductive spacer. The first substrate includes a pixel electrode disposed in a display area configured to display an image and first and second common voltage lines disposed in a peripheral area surrounding the display area. The second substrate includes a common electrode facing the pixel electrode and the first and second common voltage lines. The fluidic layer is disposed between the pixel electrode and the common electrode and is configured to control the light transmittance of the electro-wetting display panel. Each of the first and second conductive spacers is disposed between the common electrode and each of the first and second common voltage lines. The driving part is configured to apply first and second voltages to the first and second common voltage lines, respectively. The second voltage has a different level from the first voltage.

According to a method of driving an electro-wetting display panel and an electro-wetting display apparatus for performing the same, grayscales for an image data from a first gate line to an n-th gate line can substantially linearly increase, so that the electro-wetting display panel may uniformly display the brightness.

A power generating part provides data driving voltages different from each other to a gamma voltage generating part at every horizontal period, so that a back-flow may be prevented, a driving frequency may not increase, and an upper side and a lower side of the electro-wetting display panel may uniformly display the brightness.

In addition, data voltages based on compensated data compensating an image data at every horizontal period are provided, so that a back-flow may be prevented, a driving frequency may not increase, and an upper side and a lower side of the electro-wetting display panel may uniformly display the brightness.

In addition, first to n-th gate lines are alternately driven in a first direction and in a second direction opposite to the first direction, so that the electro-wetting display panel may uniformly display the brightness.

BRIEF DESCRIPTION OF THE DRAWINGS

Example embodiments of the present invention will become more apparent by describing in detailed example embodiments thereof with reference to the accompanying drawings, in which.

DETAILED DESCRIPTION OF EXAMPLE EMBODIMENTS OF THE INVENTION

Figure 1:
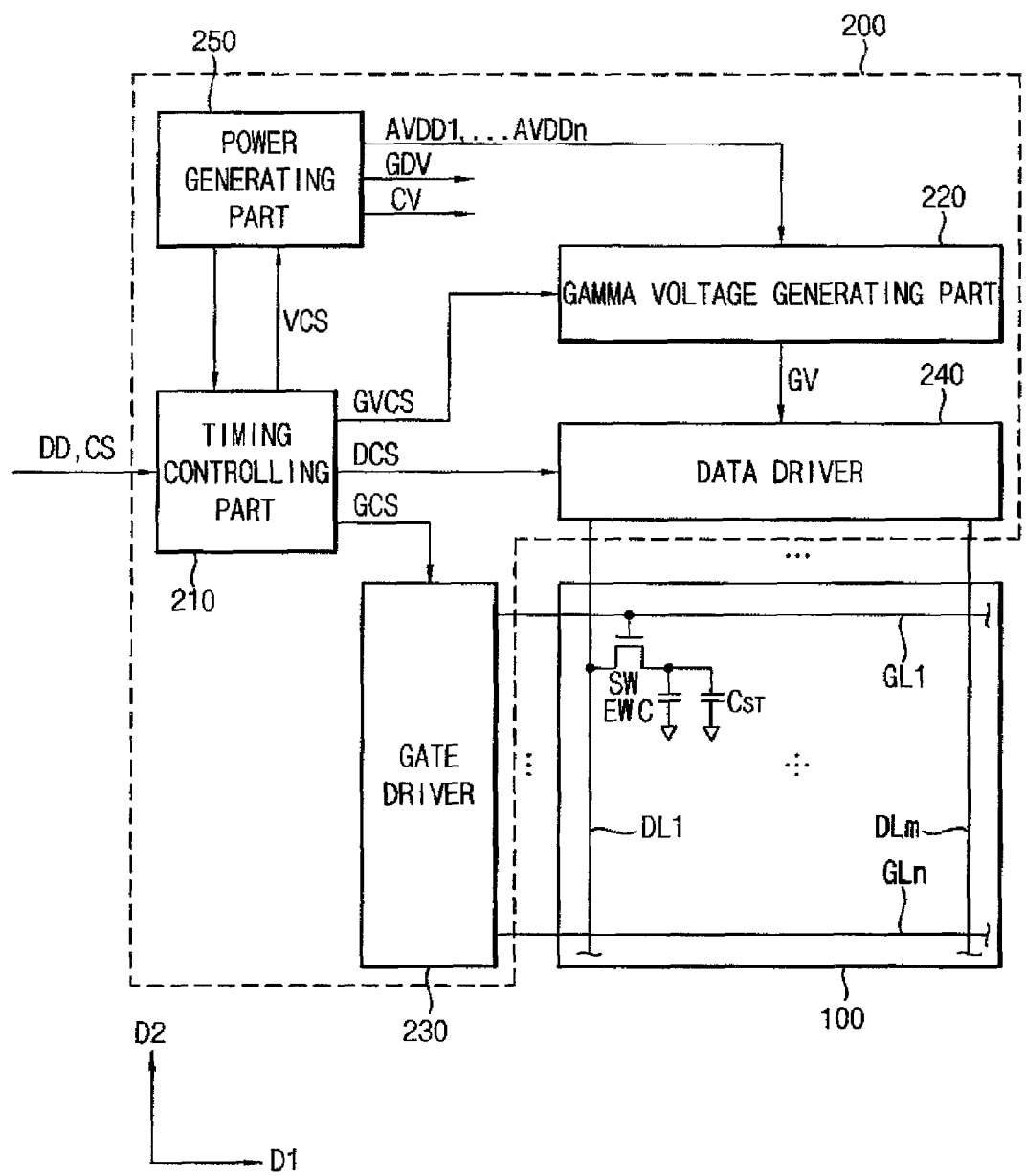
FIG. 1 is a block diagram illustrating an electro-wetting display apparatus according to an example embodiment of the present invention.

Hereinafter, example embodiments of the present invention will be explained in detail with reference to the accompanying drawings, wherein the same reference numerals may be used to denote the same or substantially the same elements throughout the specification and the drawings. The present invention may be embodied in various different ways and should not be construed as limited to the exemplary embodiments described herein.

It will be understood that when an element or layer is referred to as being "on", "connected to" or "coupled to" another element or layer, it can be directly on, connected to or coupled to the other element or layer or intervening elements or layers may be present.

As used herein, the singular forms, "a", "an", and "the" are intended to include plural forms as well, unless the context clearly indicates otherwise.

Figure 2:
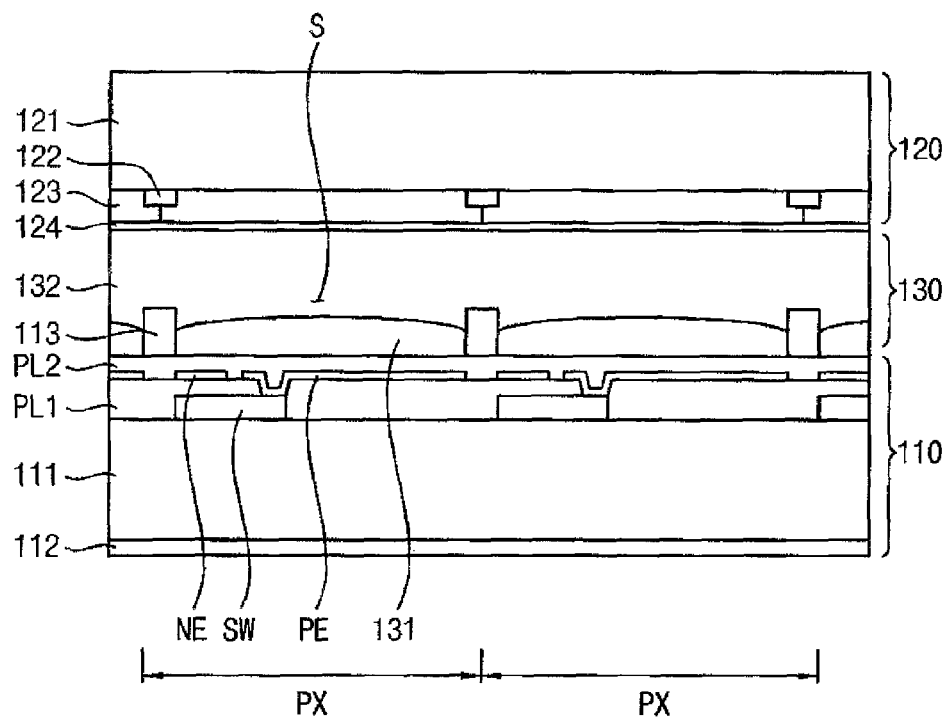
FIG. 2 is a cross-sectional view illustrating an electro-wetting display panel of FIG. 1.

FIG. 1 is a block diagram illustrating an electro-wetting display apparatus according to an example embodiment of the present invention. FIG. 2 is a cross-sectional view illustrating an electro-wetting display panel of FIG. 1.

Referring to FIGS. 1 and 2, an electro-wetting display apparatus according to the present example embodiment includes, for example, an electro-wetting display panel 100 and a driving part 200.

The electro-wetting display panel 100 is driven by the driving part 200 to display an image by controlling light transmittance of light passing through the electro-setting display panel 100. The electro-wetting display panel 100 includes, for example, a first substrate 110, a second substrate 120 facing the first substrate 110 and a fluidic layer 130 disposed between the first and second substrates 110 and 120. The electro-wetting display panel 100 may further include, for example, an electro-wetting capacitor EWC formed between the first substrate 110 and the second substrate 120.

The first substrate 110 includes, for example, a first base substrate 111, a plurality of pixel parts PX disposed on the first surface of the first base substrate 111 and a reflecting plate 112 disposed on a second surface of the first base substrate 111. The pixel part PX includes, for example, gate lines GL (for example, GL1, . . . , GLn), data lines DL (for example, DL1, . . . , DLm), switching elements SW, a first passivation layer PL1, pixel electrodes PE, notch electrodes NE, a second passivation layer PL2 and partition walls 113. Here, 'n' and 'm' are, for example, natural numbers which are no less than 2.

The gate lines GL extend in a first direction D1, and the data lines DL extend in a second direction D2 crossing the first direction D1. Example embodiments of the present invention are not limited to the above-mentioned positions for the gate lines GL and the data lines DL. Alternatively, for example, the data lines DL may instead extend in the first direction D1, and the gate lines GL may instead extend in the second direction D2 crossing the first direction D1. Each of the switching elements SW is electrically connected to one of the gate lines GL and one of the data lines DL.

The first passivation layer PL1 is disposed on the switching element SW. The pixel electrode PE is disposed on the first passivation layer PL1. The pixel electrode PE is electrically connected to the switching element SW through a contact hole of the first passivation layer PL1. The switching element SW is partially exposed through the contact hole. A data voltage may be applied to the pixel electrode PE through the data line DL.

The notch electrode NE is disposed on the pixel electrode PE. The notch electrode NE is disposed adjacent to the pixel electrode PE. A voltage applied to the common electrode 124 of the second substrate 120 may be, for example, substantially the same as the voltage applied to the notch electrode NE.

The second passivation layer PL2 is disposed on the pixel electrode PE and the notch electrode NE. The second passivation layer PL2 includes, for example, hydrophobic material.

The partition wall 113 is disposed on the second passivation layer PL2. The partition wall 113 is disposed along an edge of the pixel part PX to form a receiving space S.

The reflecting plate 112 reflects light having passed through the second substrate 120, the fluidic layer 130 and the first substrate 110 toward the second substrate 120. The reflective plate can be made of, for example, a metal having high reflectivity such as, aluminum (Al), platinum (Pt), molybdenum (Mo) or aluminum alloy.

The second substrate 120 includes, for example, a second base substrate 121 and a plurality of color parts. The color parts are disposed on the second base substrate 121 and overlaps with the pixel part PX. The color part may include, for example, a light blocking pattern 122, a color filter 123 and a common electrode 124. The first substrate 110 and the second substrate 120 can be made of, for example, rigid glass substrates or flexible polymer substrates.

The light blocking pattern 122 is disposed on the second base substrate 121 and overlaps with the partition wall 113. The light blocking pattern 122 can be made of, for example, parylene, silicon oxide ($SiO_x$), silicon nitride ($SiN_x$), poly (vinyldiene fluoride)), lead zirconate titanate (PZT), or barium strontium titanate (BST).

The color filter 123 is disposed on the second base substrate 121 and is disposed between light blocking patterns 122 which are adjacent to each other. The common electrode 124 is disposed on the color filter 123. The common electrode 124 faces the pixel electrode PE and the notch electrode NE.

The fluidic layer 130 includes, for example, a first fluid 131 and a second fluid 132. For example, the first fluid 131 is hydrophobic, and the second fluid 132 is hydrophilic. The first fluid 131 is disposed in the receiving space S formed by the partition wall 113. The first fluid 131 can be, for example, a non-polar liquid such as, for example, an oil including hexadecane, decane, dodecane or tetradecane. In an embodiment, the first fluid 131 may include a colored oil such as, for example, black oil. Other colored oils may also be utilized as the first fluid 131 such as, for example, red oils, blue oils, green oil, magenta oils, yellow oils and cyan oils. The second fluid 132 is immiscible in the first fluid 131 and the second fluid 132 may be a polar liquid such as, for example, water or a salt solution such as, for example, a solution of sodium chloride or potassium chloride in water.

The first fluid 131 fills the receiving space S formed by the partition wall 113 between the first substrate 110 and the second substrate 120. The remaining space between the first substrate 110 and the second substrate 120 is filled with the second fluid 132.

Alternatively, the color filter 123 may be omitted, so that the display apparatus may display only black and white.

Alternatively, the color filter 123 may be omitted, and the first fluid 131 may include other color dyes or pigments other than a black color, so that the display apparatus may display various colored images. For example, in an embodiment, the first fluid 131 may include other dyes or pigments of primary colors such as red, green, cyan, magenta, blue, or yellow.

As shown in FIG. 2, when a voltage applied to the common electrode 124 is substantially the same as the pixel electrode PE, a voltage difference is not formed between the common electrode 124 and the pixel electrode PE. The first fluid 131 is broadly spread in the receiving space S without a voltage difference between the common electrode 124 and the pixel electrode PE, so that the first fluid 131 can cover the pixel electrode PE and the notch electrode NE. Thus, the light passing through the second substrate 120 can be blocked by the first fluid 131, so that the pixel part PX displays a black image corresponding to a black grayscale.

Figure 3A:
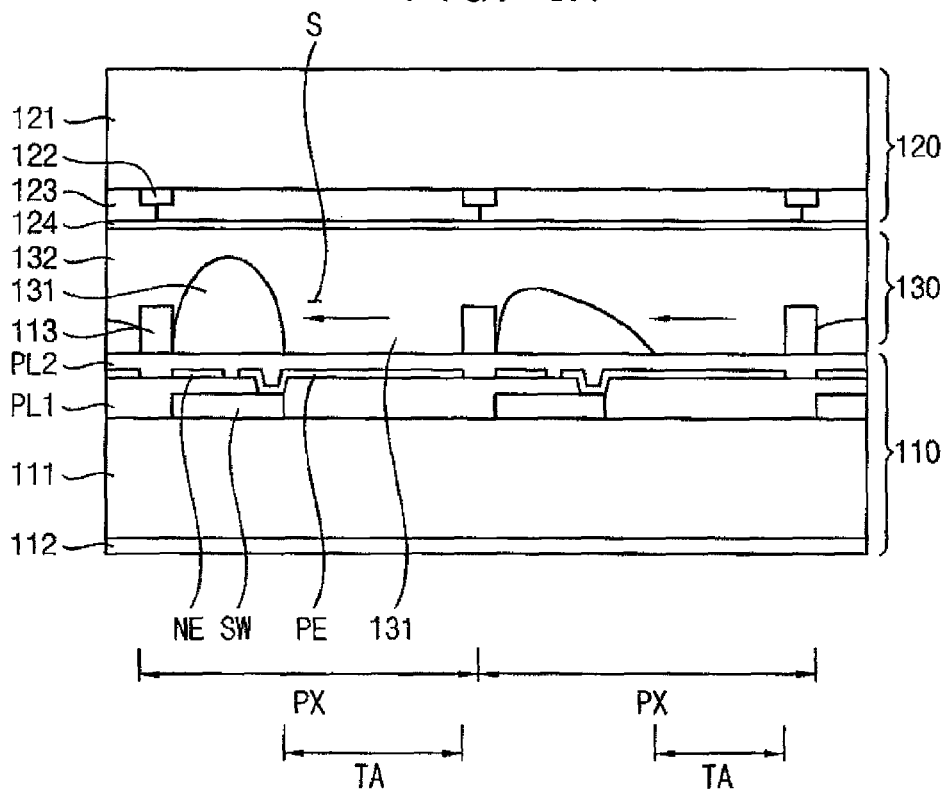
FIG. 3A is a cross-sectional view illustrating the electro-wetting display panel having a voltage difference between a common electrode and a pixel electrode.

FIG. 3A is a cross-sectional view illustrating the electro-wetting display panel having a voltage difference between a common electrode and a pixel electrode.

Referring to FIG. 3A, when a voltage applied to the common electrode 124 is different from the pixel electrode PE, a voltage difference is formed between the common electrode 124 and the pixel electrode PE. The first fluid 131 moves toward the notch electrode NE receiving the same voltage as the common electrode 124 that has the voltage difference from the pixel electrode PE. Thus, a transmitting area TA in which light is transmitted is formed. Thus, the light having passed through the second substrate 120 and the first substrate 110 is reflected from the reflecting plate 112, and is incident into the second substrate 120.

When an absolute value of the voltage difference between the common electrode 124 and the pixel electrode PE increases, the movement of the first fluid 131 toward the notch electrode NE may be increased so that the size of the transmitting area TA increases. Thus, the pixel part PX may display a white image of a white grayscale and gray images of medium grayscales adjacent to the white grayscale. When an absolute value of the voltage difference between the common electrode 124 and the pixel electrode PE decreases, the movement of the first fluid 131 can be decreased so that the size of the transmitting area TA decreases. Thus, the pixel part PX may display gray images of medium grayscales adjacent to the black grayscale.

Figure 3B:
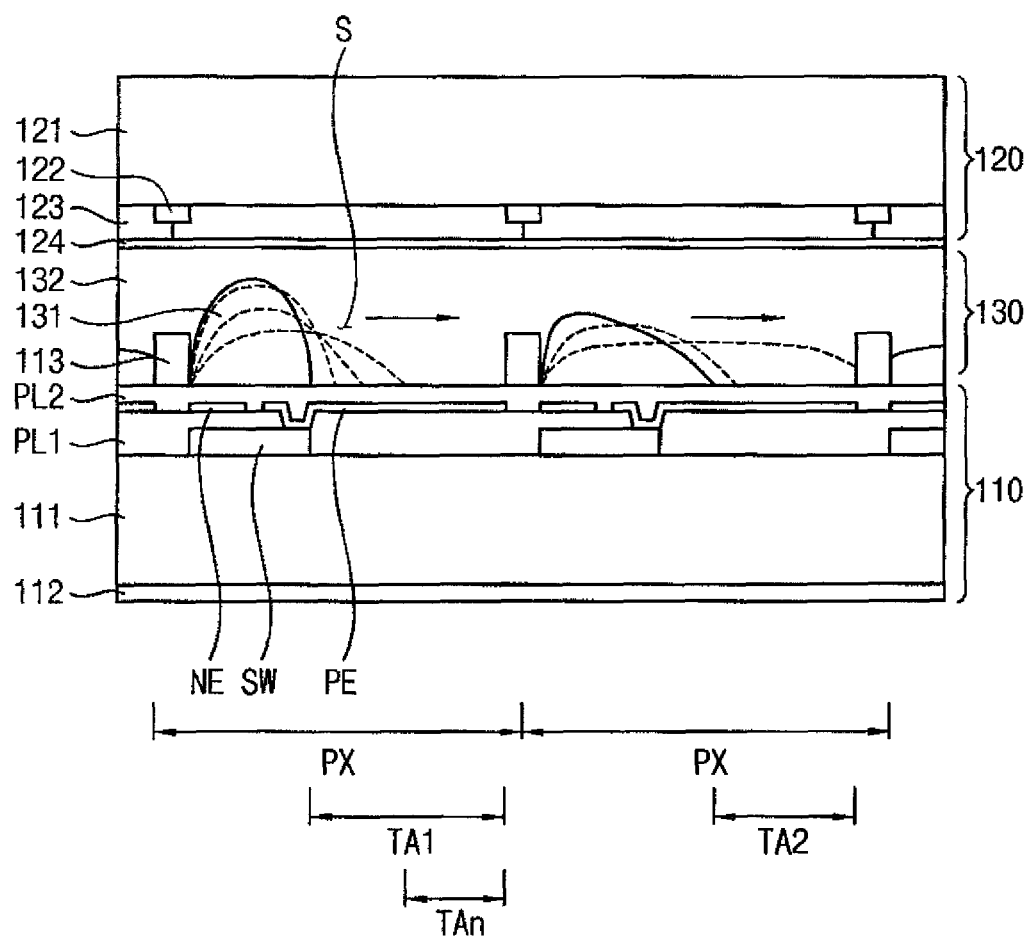
FIG. 3B is a cross-sectional view illustrating the electro-wetting display panel without voltage difference between a common electrode and a pixel electrode during consecutive frames.

FIG. 3B is a cross-sectional view illustrating the electro-wetting display panel without voltage difference between a common electrode and a pixel electrode during consecutive frames.

Referring to FIG. 3B, when voltage differences between the common electrode 124 and the pixel electrode PE of the pixel part PX are substantially the same during adjacent frames of first to n-th frames, the size of the transmitting areas TA formed by the first fluid 131 may be theoretically the same during the first to n-th frames (here, 'n' is a natural number which is no less than 2).

However, in an actual electro-wetting display apparatus, the size of the transmitting area TA can decrease from the first to n-th frames although the voltage differences between the common electrode 124 and the pixel electrode PE of the pixel part PX are substantially the same during the adjacent frames of the first to n-th frames. In the actual electro-wetting display apparatus, the first fluid 131 can back-flow during the first to n-th frames, so that size of the transmitting area TA can decrease from the first to n-th frames.

For example, the first fluid 131 moves toward the notch electrode NE during the first frame according to the voltage difference between the common electrode 124 and the pixel electrode PE to form a first transmitting are TA1 having a first size. However, the first fluid 131 back flows during the n-th frame. Thus, the first fluid 131 does not form the first transmitting area TA1 having the first size during the n-th frame although the same voltage difference as the first frame is formed between the common electrode 124 and the pixel electrode PE. However, the first fluid 131 forms a second transmitting area TA2 having a second size smaller than the first size. Thus, the grayscale of the image displayed on the pixel part PX during the n-th frame is decreased, so that the brightness of the pixel part PX decreases.

Hereinafter, the driving part 200 preventing the first fluid 131 from back-flowing is explained in detail.

Referring to FIG. 1 again, the driving part 200 includes, for example, a timing controlling part 210, a gamma voltage generating part 220, a gate driver 230, a data driver 240 and a power generating part 250.

The timing controlling part 210 receives an image data DD and a control signal CS from the outside of the electro-wetting display apparatus.

The timing controlling part 210 generating a gamma voltage control signal GVCS, a gate control signal GCS, a data control signal DCS and a power control signal VCS based on the control signal CS.

The timing controlling part 210 applies the gate control signal GCS to the gate driver 230. The gate control signal GCS may include, for example, a vertical sync signal (vertical synchronization signal) alarming a start of a frame, and an input control signal selecting an operating mode.

The timing controlling part 210 applies the data control signal DCS to the data driver 240, and the data control signal DCS may include, for example, a horizontal sync signal corresponding to a horizontal period.

The timing controlling part 210 applies the power control signal VCS to the power generating part 250, and the power control signal VCS may include, for example, the horizontal sync signal.

The timing controlling part 210 applies the gamma voltage control signal GVCS to the gamma voltage generating part 220, and the gamma voltage control signal GVCS may include, for example, the horizontal sync signal.

The power generating part 250 generates a gate driving voltage GDV, a data driving voltage AVDD (e.g. first to n-th data driving voltages AVDD1 . . . AVDDn) and a common voltage CV. The power generating part 250 applies the gate driving voltage GDV, the data driving voltage AVDD and the common voltage CV to the gate driver 230, the gamma voltage generating part 220 and the common electrode CE, respectively.

Figure 4:
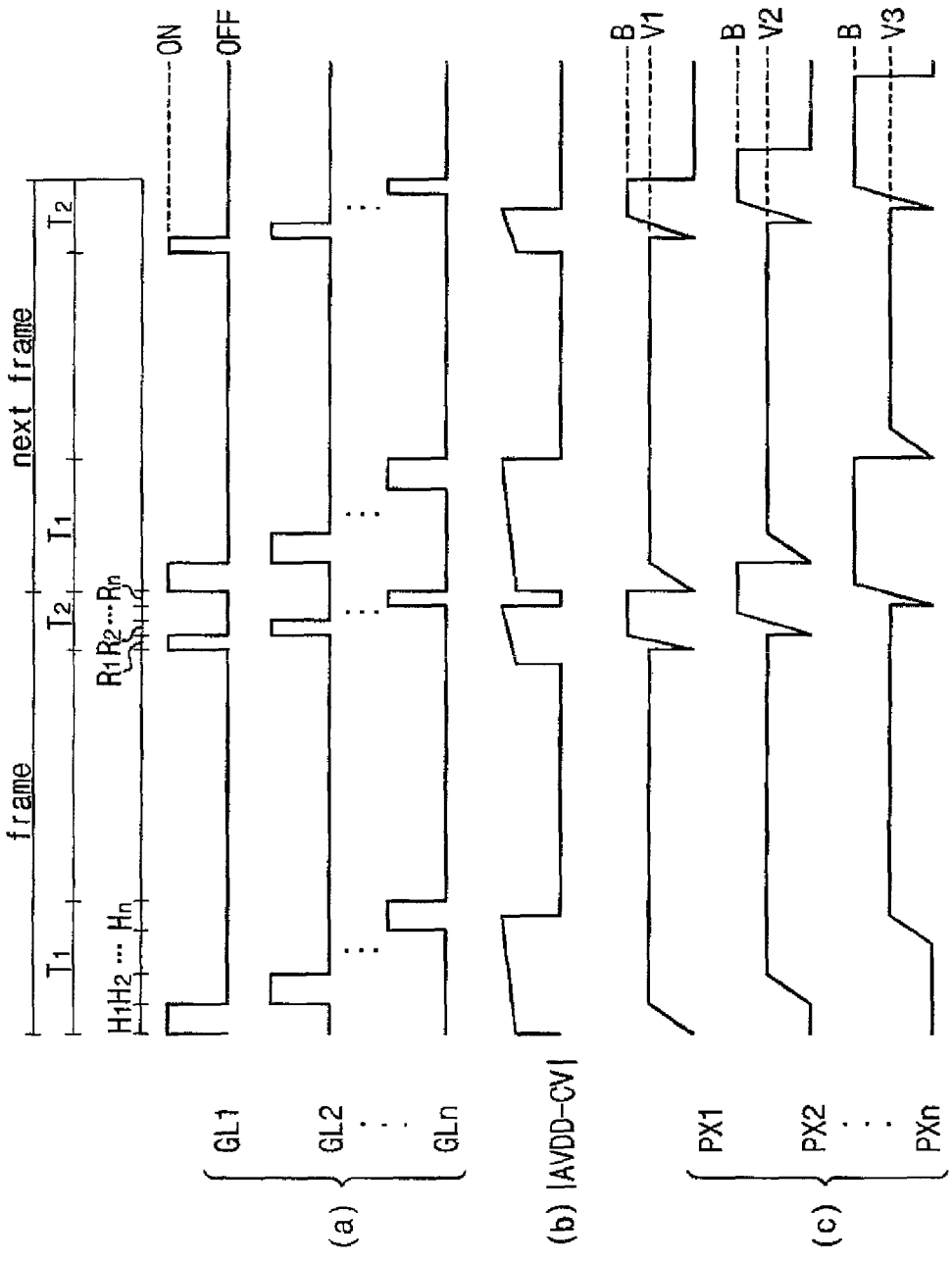
FIG. 4 is timing diagrams illustrating electrical signals applied to the electro-wetting display apparatus of FIG. 1.

FIG. 4 is timing diagrams illustrating electrical signals applied to the electro-wetting display apparatus of FIG. 1.

Referring to FIGS. 1 and 4, the power generating part 250 applies the gate driving voltage GDV to the gate driver 230 during a frame.

The gate driver 230 applies first to n-th gate-on voltages and first to n-th reset voltages generated based on the gate driving voltages to the first to n-th gate lines GL1, . . . , GLn, respectively.

In FIG. 4, the first to n-th gate-on voltages have levels substantially the same. However, the first to n-th gate-on voltages may have levels different from each other.

Referring to FIG. 4 and a reference numeral (a), the gate driver 230 sequentially applies the first to n-th gate-on voltages to the first to n-th gate lines GL1, . . . , GLn during the first time T1 of the frame, respectively. The gate driver 230 sequentially applies the first to n-th reset voltages to the first to n-th gate lines GL1, . . . GLn during the second time T2 of the frame. The second time T2 may be discontinuous with the first time T1. The n-th gate line GLn is a last gate line. The first time T1 is, for example, at least about two times longer than the second time T2.

For example, the frame is about 16.7 ms. When the first time T1 is about two times longer than the second time T2, the first time T1 may be about two eleventh of the frame, and the second time T2 may be about one eleventh of the frame.

Thus, the first to n-th gate lines GL1, . . . , GLn are sequentially driven during the first time T1 of the frame, so that the switching element SW electrically connected to the first gate line GL1 to the switching element SW electrically connected to the n-th gate line GLn are sequentially turned on. The first to n-th gate lines GL1, . . . , GLn are sequentially driven during the second time T2 of the frame again, so that the switching elements SW electrically connected to the first to n-th gate lines GL1, . . . , GLn are sequentially turned on again.

A portion of the first time T1 from a rising edge of a driving signal of an (n−1)-th gate line GLn−1 to a falling edge of the driving signal of the (n−1)-th gate line GLn−1 is defined as an (n−1)-th horizontal period Hn−1 of an (n−1)-th gate line GLn−1.

A portion of the second time T2 from a rising edge of a driving signal of an (n−1)-th gate line GLn−1 to a falling edge of the driving signal of the (n−1)-th gate line GLn-1 in the second time T2 of the frame is defined as an (n−1)-th reset period Rn−1 of an (n−1)-th gate line GLn−1.

For example, the first to n-th horizontal periods H1, . . . , Hn may have substantially the same width, and the first to n-th reset periods R1, . . . , Rn may have substantially the same width. The width of each of the first to n-th horizontal periods H1, . . . , Hn is, for example, at least about two times greater than the width of each of the first to n-th reset periods R1, . . . , Rn.

The power generating part 250 sequentially applies the first to n-th data driving voltages AVDD1, . . . , AVDDn to the gamma voltage generating part 220 according to the horizontal sync signals synchronized with each of the first to n-th horizontal periods H1, . . . , Hn during the first time T1 of the frame. The first to n-th data driving voltages AVDD1, . . . , AVDDn have levels different from each other.

Referring to FIG. 4 and the reference numeral (b), the absolute value of the voltage difference between the common voltage CV and the data driving voltage AVDD substantially linearly increases from the first to n-th data driving voltages AVDD1, . . . , AVDDn. For example, a difference between the absolute value of the voltage difference between the common voltage CV and the first data driving voltage AVDD1 and the absolute value of the voltage difference between the common voltage CV and the n-th data driving voltage AVDDn may be changed according to the brightness difference between the first pixel part PX1 connected to the first gate line GL1 and the n-th pixel part PXn connected to the n-th gate line GLn.

The power generating part 250 applies a reset driving voltage according to a reset sync signal synchronized with the first to n-th reset periods R1, . . . , Rn during the second time T2 of the frame.

In FIG. 4 and the reference numeral (b), the absolute values of the voltage differences between the common voltage CV and the reset driving voltages may substantially linearly increase from the first to n-th reset periods R1, . . . , Rn. The absolute values of the voltage differences between the common voltage CV and the first to n-th data driving voltages AVDD1, . . . , AVDDn may also substantially linearly increase.

Alternatively, the reset driving voltage may have a constant voltage regardless of the first to n-th reset periods R1, . . . , Rn.

The gamma voltage generating part 220 receives first to n-th data driving voltages AVDD1, . . . , AVDDn from the voltage generating part 250 during the first time T1 of the frame.

The gamma voltage generating part 220 generates first to n-th reference gamma voltages based on the first to n-th data driving voltages AVDD1, . . . , AVDDn at every horizontal period during the first time T1 of the frame, respectively.

The voltage differences between the common voltage CV and the first to n-th data driving voltages AVDD1, . . . , AVDDn (|AVDD-CV|) increases from the first horizontal period H1 to the n-th horizontal period Hn. Thus, the voltage differences between the common voltage CV and the first to n-th reference gamma voltages can increase from the first horizontal period H1 to the n-th horizontal period Hn.

The gamma voltage generating part 220 receives the reset driving voltage from the voltage generating part 250 during the second time T2 of the frame. The gamma voltage generating part 250 may generate reset reference gamma voltages based on, for example, the reset driving voltage during the second time T2 of the frame.

The data driver 240 receives the image data DD from the timing controlling part 210 during the first time T1 of the frame, and the receives the first to n-th reference gamma voltages from the gamma voltage generating part 220, to generate first to n-th data voltages based on, for example, the image data DD and the first to n-th reference gamma voltages, respectively, at every horizontal period.

Thus, the data driver 240 sequentially applies the first to n-th data voltages to the first to n-th pixel parts PX1, . . . , PXn at every horizontal period during the first time T1 of the frame.

The data driver 240 generates a black voltage B based on, for example, the reset reference gamma voltages during the second time T2 of the frame.

Thus, the data driver 240 sequentially applies the black voltage B to the first to n-th pixel parts PX1, . . . , PXn at every reset period during the second time T2 of the frame.

FIG. 4 and the reference numeral (c) is timing diagrams illustrating a first pixel part PX1 electrically connected to the first gate line GL1 and an n-th pixel part PXn electrically connected to the n-th gate line GLn displaying a same image data Referring to FIG. 4 and the reference numeral (c), the first pixel part PX is charged with the first data voltages V1 during a first horizontal period H1 of the first time T1 of the frame. The first pixel part PX maintains a charged state with the first data voltage V1 before the second time T2 of the frame. Thus, an interval of the charged state of the first pixel part PX1 charged with the first data voltage V1 is about ten eleventh of the frame.

The n-th pixel part PXn is charged with the n-th data voltages Vn during the n-th horizontal period Hn of the first time T1 of the frame, and is maintained with the n-th data voltage Vn before the n-th reset period Rn of the second time T2 of the frame. Thus, an interval when the n-the pixel part PXn is charged and maintained with the n-th data voltage Vn is about nine eleventh of the frame.

The interval when the first pixel part PX1 is charged and maintained with the first data voltage V1 is longer than the interval when the n-the pixel part PXn is charged and maintained with the n-th data voltage Vn. However, the n-th data voltage Vn based on the n-th reference gamma voltage has a level lower than that of the first data voltage V1 based on, for example, the first reference gamma voltage, so that the brightness of the pixel part PX1 is substantially the same as the brightness of the n-th pixel part PXn.

In the present example embodiment, the power generating part 250 changes the data driving voltage at every horizontal period. However, the power generating part 250 may change the data driving voltage at every at least two horizontal periods.

According to the present example embodiment, the power generating part 250 provides data driving voltages different from each other to the gamma voltage generating part 220 at every horizontal period, so that the data driver 240 provides the data voltages based on the data driving voltages AVDD different from each other to the electro-wetting display panel 100 at every horizontal period. Thus, the electro-wetting display panel 100 may uniformly display the brightness.

Figure 5:
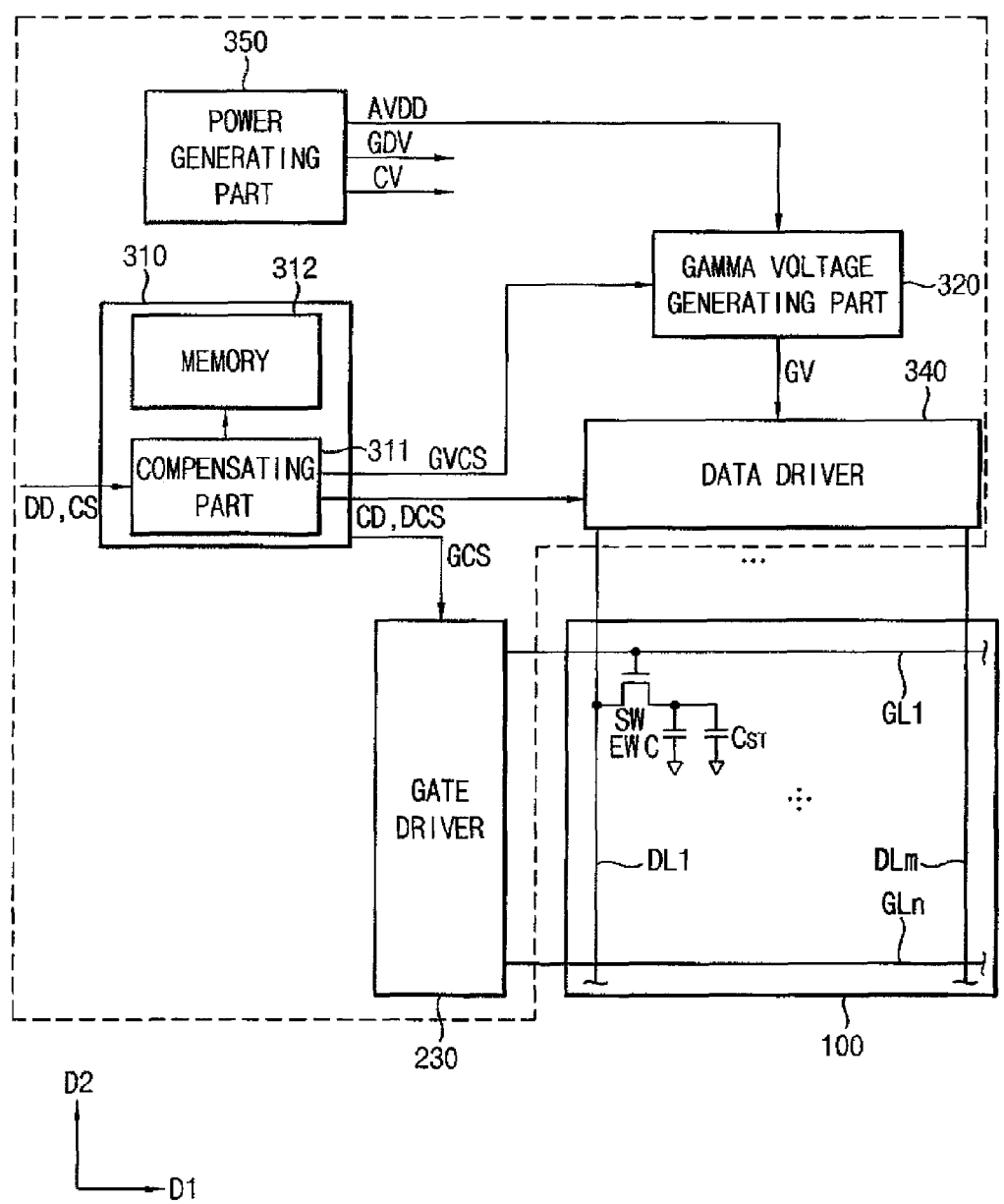
FIG. 5 is a block diagram illustrating a timing control part, a gamma voltage generating part, a source driver and a power generating part of an electro-wetting display apparatus according to an example embodiment of the present invention.
Figure 6:
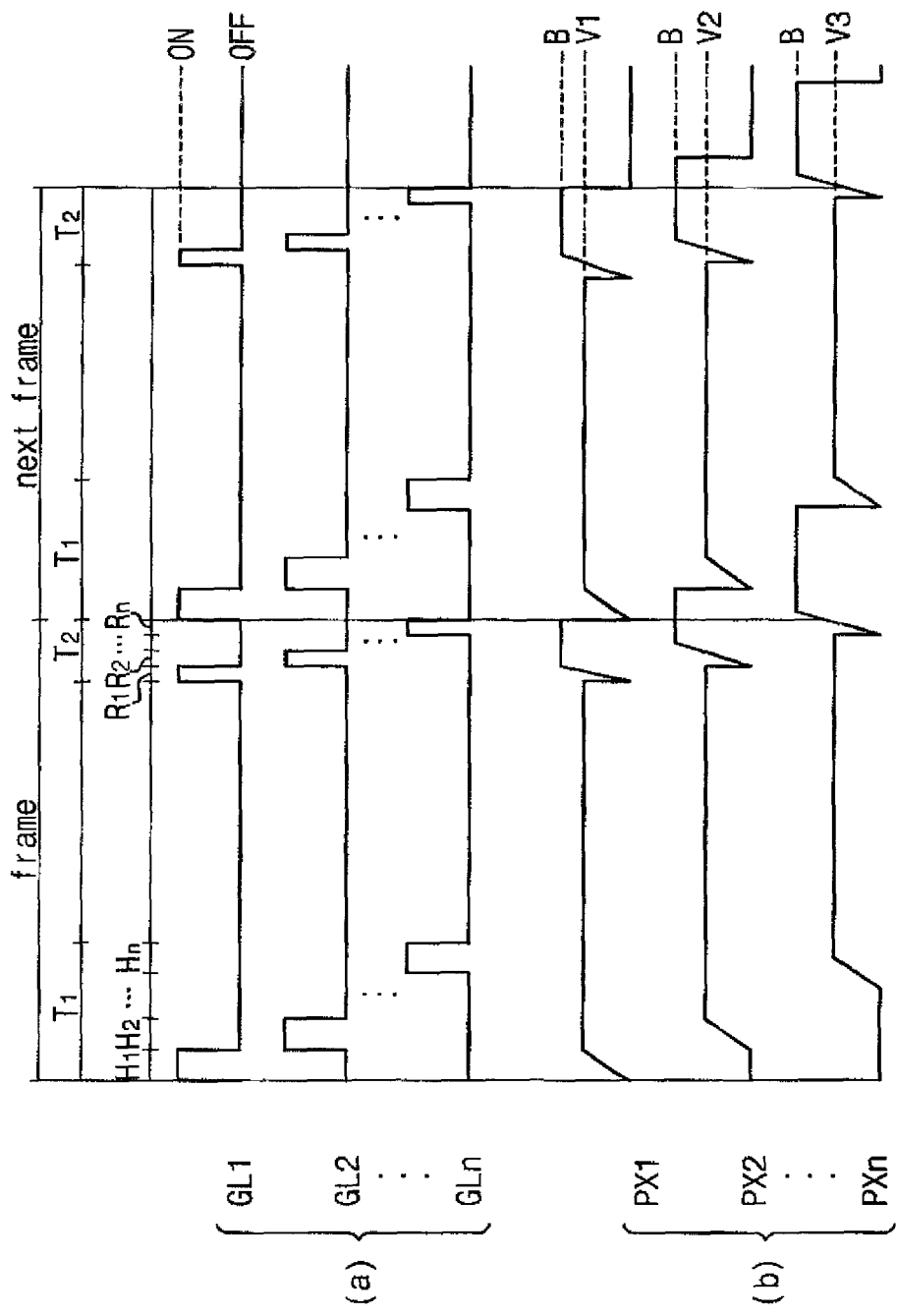
FIG. 6 is timing diagrams illustrating electrical signals of FIG. 5.

FIG. 5 is a block diagram illustrating a timing control part, a gamma voltage generating part, a source driver and a power generating part of an electro-wetting display apparatus according to an example embodiment of the present invention. FIG. 6 is timing diagrams illustrating electrical signals of FIG. 5.

An electro-wetting display apparatus according to the present example embodiment is substantially the same as the electro-wetting display apparatus according to FIG. 1 except for a timing controlling part, a gamma voltage generating part, a data driver and a power generating part, and thus the same reference numerals will be used to refer to the same or like parts as those described for the electro-wetting display apparatus of FIG. 1 and any repetitive explanation concerning the above elements will be omitted.

Referring to FIG. 5 and FIG. 6, a driving part according to the present example embodiment includes, for example, a timing controlling part 310, a gamma voltage generating part 320, a gate driver 230, a data driver 340 and a power generating part 350.

The power generating part 350 generates, for example, a gate driving voltage GDV, a data driving voltage AVDD and a common voltage CV, and provides the gate driving voltage GDV, the data driving voltage AVDD and the common voltage CV to the gate driver 230, the gamma voltage generating part 320 and the common electrode CE, respectively.

The timing controlling part 210 receives an image data DD and a control signal CS from the outside of the electro-wetting display apparatus.

The timing controlling part 310 generates, for example, a gamma reference control signal GVCS, a gate control signal GCS, a data control signal DCS and a power control signal VCS1 based on the control signal CS, and provides the gamma reference control signal GVCS, the gate control signal GCS, the data control signal DCS and the power control signal VCS1 to the gamma voltage generating part 320, the gate driver 230, the data driver 340 and the power generating part 350, respectively.

The gate control signal GCS may include, for example, a vertical sync signal V alarming a start of a frame, and an input control signal 1 selecting an operating mode. The data control signal DCS may include, for example, horizontal sync signals synchronized with timings outputting gate on voltages to a first gate line GL1 to an n-th gate line GLn, etc.

The timing control part 310 includes, for example, a compensating part 311 and a memory 312.

The compensating part 311 compensates the image data DD based on gamma curves different from each other at every horizontal period to generate compensating data.

For example, the compensating part 311 compensates the image data DD corresponding to the first horizontal period H1 of the first time T1 of the frame using a first look-up table of the memory 312. The look-up table may include, for example, compensated data based on an original gamma curve. Thus, the compensated data based on the original gamma curve is outputted to the data driver 340 during the first horizontal period H1.

Alternatively, the first look-up table may be omitted. Thus, the image data DD corresponding to the first horizontal period H1 can be directly outputted to the data driver 340 without being compensated.

The compensating part 311 compensates the image data DD corresponding to the second to n-th horizontal period H2, . . . , Hn of the first time T1 of the frame using, for example, second to n-th look-up tables of the memory 312. The brightness of the electro-wetting display panel 100 can substantially linearly increase with respect to the original gamma curve from the second look-up table to the n-th look-up table. Thus, the compensated data based on, for example, gamma curves having the brightness higher than that of the original gamma curve is outputted to the data driver 340.

The gamma voltage generating part 220 generates reference gamma voltages based on, for example, the data driving voltage AVDD received from the power generating part 350.

The data driver 340 receives the compensated data CD from the timing controlling part 310 and receives the reference gamma voltages from the gamma voltage generating part 320 to generate data voltages based on, for example, the compensated data CD and the reference gamma voltages, during the first time T1 of the frame.

The data driver 340 sequentially provides the data voltages to the first to n-th pixel parts PX1, . . . , PXn electrically connected to the first to n-th gate lines GL1, . . . , GLn respectively at every horizontal period, during the first time T1 of the frame.

The data driver 340 sequentially provides a black voltage B to the first to n-th pixel parts PX1, . . . , PXn electrically connected to the first to n-th gate lines GL1, . . . , GLn, during the second time T2 of the frame.

According to the present example embodiment, the driving part 300 provides the data voltages based on, for example, the compensated data CD compensating the image data DD to the electro-wetting display panel 100 at every horizontal period, so that the electro-wetting display panel 100 may uniformly display the brightness.

Figure 7:
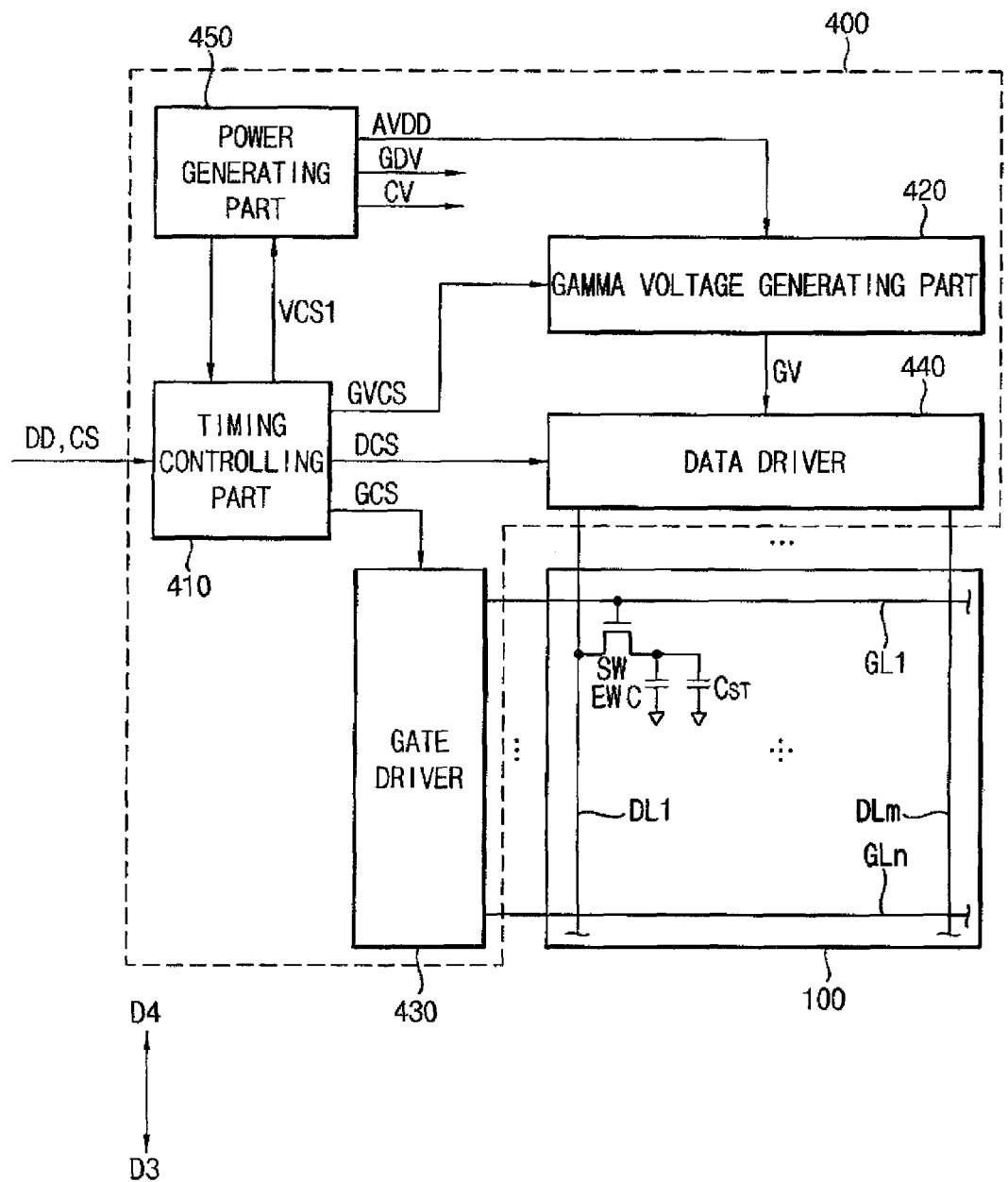
FIG. 7 is a block diagram illustrating an electro-wetting display apparatus according to an example embodiment of the present invention.
Figure 8:
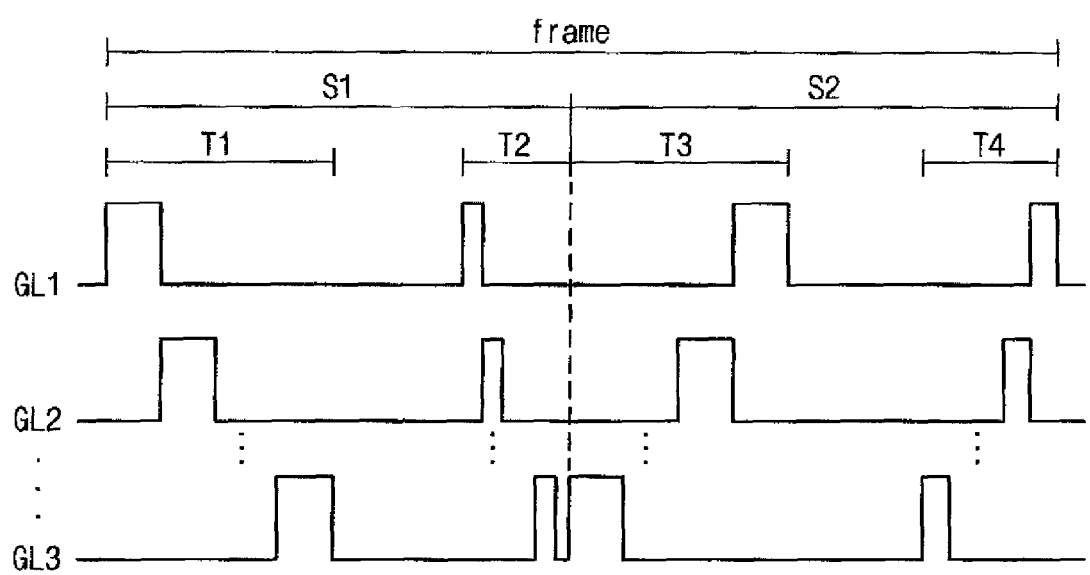
FIG. 8 is a timing diagram illustrating electrical signals of FIG. 7.

FIG. 7 is a block diagram illustrating an electro-wetting display apparatus according to an example embodiment of the present invention. FIG. 8 is timing diagrams illustrating electrical signals of FIG. 7.

An electro-wetting display apparatus according to the present example embodiment is substantially the same as the electro-wetting display apparatus of FIG. 1 except for a driving part, and thus the same reference numerals will be used to refer to the same or like parts as those described in the previous example embodiment of FIG. 1 and any repetitive explanation concerning the above elements will be omitted.

Referring to FIG. 7 and FIG. 8, a driving part 400 according to the present example embodiment includes, for example, a timing controlling part 410, a gamma voltage generating part 420, a gate driver 430, a data driver 440 and a power generating part 450.

The power generating part 450 generates, for example, a gate driving voltage GDV, a data driving voltage AVDD and a common voltage CV, and provides the gate driving voltage GDV, the data driving voltage AVDD and the common voltage CV to the gate driver 430, the gamma voltage generating part 420 and the common electrode CE, respectively.

The timing controlling part 410 receives an image data DD and a control signal CS from outside the electro-wetting display apparatus.

The timing controlling part 410 generates, for example, a gamma reference control signal GVCS, a gate control signal GCS, a data control signal DCS and a power control signal VCS1, to provide to the gamma voltage generating part 420, the gate driver 430, the data driver 440 and the power generating part 450, based on the control signal CS.

The gate control signal GCS may include, for example, a vertical sync signal V1 alarming a start of a first period S1 and a second period S2 of a frame, and an input control signal I1 selecting an operating mode driving the first to n-th gate lines GL1, . . . , GLn in a first direction D3 or a second direction D4 opposite to the first direction D3.

The data control signal DCS may include, for example, horizontal sync signals synchronized with timings outputting gate on voltages to the first to n-th gate lines GL1, . . . , GLn.

The gate driver 430 sequentially drives the first to n-th gate lines GL1, . . . , GLn in the first direction D3, and then sequentially drives the first to n-th gate lines GL1, . . . , GLn in the second direction D4 opposite to the first direction D3, during a frame.

For example, the gate driver 430 sequentially provides the gate on voltages from the first gate line GL1 to the n-th gate line GLn during the first time T1 of the first period S1 of the frame, and then sequentially provides the reset voltages from the first gate line GL1 to the n-th gate line GLn during the second time T2 of the first period S1 of the frame. The first time T1 may be, for example, at least about three times longer than the second time T2.

Thus, the first to n-th gate lines GL1, . . . , GLn are sequentially driven in the first direction D3 during the first time T1 of the first period S1 of the frame, so that the switching element SW connected to the first gate line GL1 to the switching element SW connected to the n-th gate line GLn are sequentially turned on in the first direction D3. The first to n-th gate lines GL1, . . . , GLn are sequentially driven in the first direction D3 during the second time T2 of the first period S1 of the frame again, so that the switching element SW connected to the first gate line GL1 to the switching element SW connected to the n-th gate line GLn are sequentially turned on in the first direction D3 again.

Thus, the time charging and maintaining the data voltage may be insufficient from the first pixel part PX1 to the n-th pixel part PXn, so that the brightness may be reduced from the first pixel part PX1 to the n-th pixel part PXn.

The gate driver 430 sequentially provides the gate on voltages from the n-th gate line GLn to the first gate line GL1 during a third time T3 of the second period S2 of the frame, and then sequentially provides the reset voltages from the n-th gate line GLn to the first gate line GL1 during a fourth time T4 of the first period S1 of the frame. The third time T3 may be, for example, at least about three times longer than the fourth time T4.

Thus, the first to n-th gate lines GL1, . . . , GLn are sequentially driven in the first direction D3 during the third time T3 of the second period S2 of the frame, so that the switching element SW connected to the first gate line GL1 to the switching element SW connected to the n-th gate line GLn are sequentially turned on in the second direction D4. The first to n-th gate lines GL1, . . . , GLn are sequentially driven in the second direction D4 during the fourth time T4 of the first period S2 of the frame again, so that the switching element SW connected to the first gate line GL1 to the switching element SW connected to the n-th gate line GLn are sequentially turned on in the second direction D4 again.

Thus, the time charging and maintaining the data voltage may be insufficient from the n-th pixel part PXn to the first pixel part PX1, so that the brightness may be reduced from the n-th pixel part PXn to the first pixel part PX1.

According to the present example embodiment, the first to n-th gate lines GL1, ..., GLn are alternately driven in the first direction D3 and in the second direction D4 during the frame, so that the electro-wetting display panel 100 may uniformly display the brightness.

Figure 9:
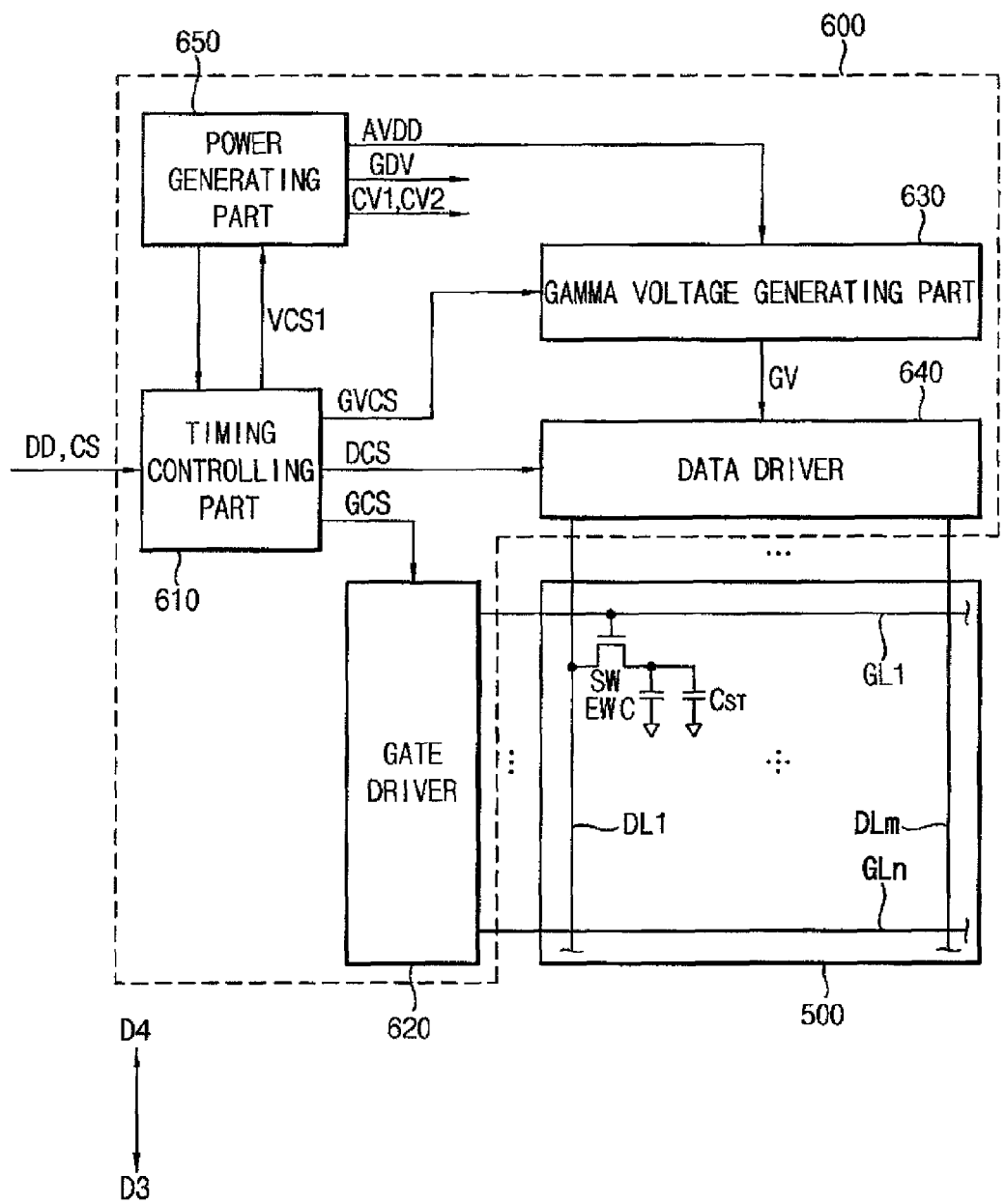
FIG. 9 is a block diagram illustrating an electro-wetting display apparatus according to an example embodiment of the present invention.
Figure 10:
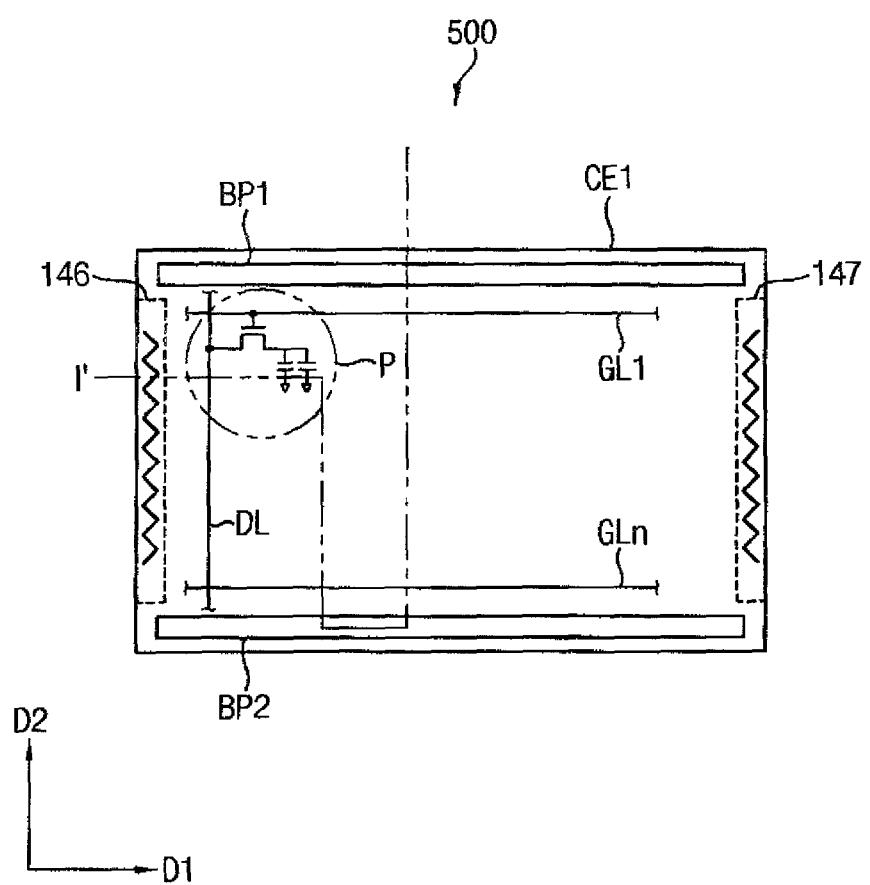
FIG. 10 is a plan view illustrating an electro-wetting display panel of FIG. 9.
Figure 11:
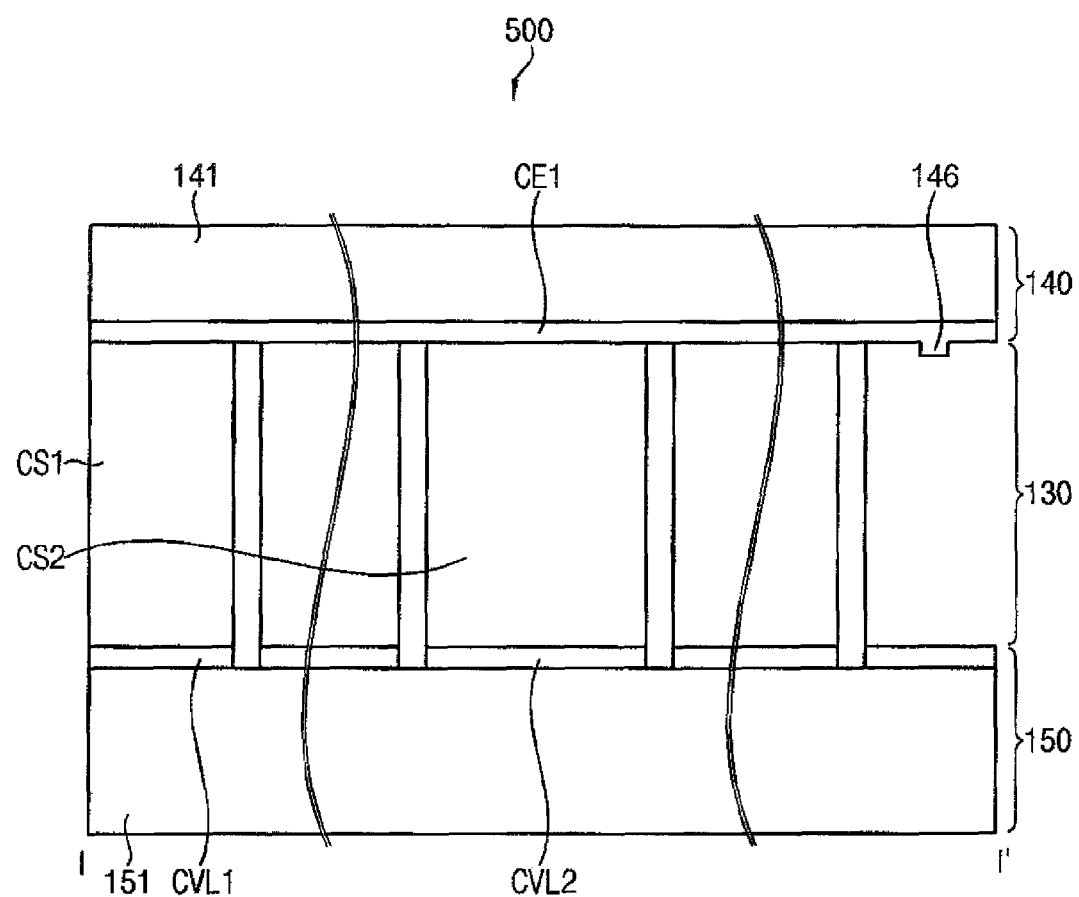
FIG. 11 is a cross-sectional view taken along a line I-I' of FIG. 10.

FIG. 9 is a block diagram illustrating an electro-wetting display apparatus according to an example embodiment of the present invention. FIG. 10 is a plan view illustrating an electro-wetting display panel of FIG. 9. FIG. 11 is a cross-sectional view taken along a line I-I' of FIG. 10.

An electro-wetting display apparatus according to the present example embodiment is substantially the same as the electro-wetting display apparatus of FIG. 1 except for a common voltage line, a conductive spacer and a driving part, and thus the same reference numerals will be used to refer to the same or like parts as those described for the electro-wetting display apparatus of FIG. 1 and any repetitive explanation concerning the above elements will be omitted.

Referring to FIG. 9, FIG. 10 and FIG. 11, an electro-wetting display apparatus according to the present example embodiment includes, for example, an electro-wetting display panel 500 and a driving part 600.

The electro-wetting display panel 500 includes, for example, a first substrate 150, a second substrate 140, a fluidic layer 130 and first and second conductive spacers CS1 and CS2.

The first substrate 150 includes, for example, a first base substrate 151 having a display area displaying an image and a peripheral area surrounding the display area, a pixel part P disposed on the display area of the first base substrate 151, wires electrically connecting the driving part 600 disposed on the peripheral area of the first base substrate 151 with the pixel part P and first and second common voltage lines CVL1 and CVL2 providing a common voltage to the common electrode CE1 of the second substrate 140.

The first common voltage line CVL1 extends, for example, in a first direction D1 on a first edge of the first base substrate 151, and is disposed adjacent to a first gate line GL. The second common voltage line GVL2 extends, for example, in the first direction D1 on a second edge of the first base substrate 151, and is disposed adjacent to an n-th gate line GLn.

A first common voltage CV1 provided from a power generating part 650 of the driving part 600 is applied to the first common voltage line CVL1, and the second common voltage CV2 provided from the power generating part 650 of the driving part 600 and different from the first common voltage CV1 is applied to the second common voltage line CVL2.

The second substrate 140 includes, for example, a second base substrate 141 and a common electrode CE1 disposed on the second base substrate 141 and facing the pixel part P and the first and second common voltage lines CVL1 and CVL2.

The first conductive spacer CS1 is disposed between the first common voltage line CVL1 and a first edge of the common electrode CE1, and extends along the first common voltage line CVL1. The second conductive spacer CS2 is disposed between the second common voltage line CVL2 and a second edge of the common electrode CE1 opposite to the first edge of the common electrode CE1, and extends along the second common voltage line CVL2. The first and second conductive spacers CS1 and CS2 include a conductive metal material.

Thus, for example, a first bar BP1 and a second bar BP2 are formed on the common electrode CE1. The first bar BP1 receives the first common voltage CV1 from the first common voltage line CVL1 by the first conductive spacer CS1, and the second bar BP2 receives the second common voltage CV2 from the second common voltage line CVL2 by the second conductive spacer CS2.

For example, the second common voltage CV2 may be larger than the first common voltage CV1. Thus, the voltage of the common electrode CE1 substantially linearly increases from the first bar BP1 to the second bar BP2.

The common electrode CE1 may further include, for example, first and second compensating patterns 146 and 147. The first and second compensating patterns 146 and 147 may be disposed on, for example, third and fourth edges connecting the first edge of the common electrode CE1 to the second edge of the common electrode CE1.

The first compensating pattern 146 is formed along the third edge, and compensates a voltage distortion generated in an area adjacent to the third edge. The second compensating pattern 147 is formed along the fourth edge, and compensates a voltage distortion generated in an area adjacent to the fourth edge. The first and second compensating patterns 146 and 147 have, for example, a concave-convex shape.

For example, as described in FIG. 11, parts of the common electrode CE1 are protruded toward the pixel electrode PE, so that the first and second compensating patterns 146 and 147 may be formed. The first and second compensating patterns 146 and 147 may have, for example, zigzag shapes extended along the third and fourth edges of the common electrode CE1. It is noted that the shapes of the first and second compensating patterns 146 and 147 are not limited to the above mentioned shapes but rather the shapes of the first and second compensating patterns 146 and 147 may be varied in accordance with exemplary embodiments of the present invention.

Alternatively, parts of the common electrode CE1 are dented, so that the first and second compensating patterns 146 and 147 may be formed.

The driving part 600 includes, for example, a timing controlling part 610, a gamma voltage generating part 630, a gate driver 620, a data driver 640 and a power generating part 650.

The timing controlling part 610 receives, for example, an image data DD and a control signal CS from the outside of the electro-wetting display apparatus.

The timing controlling part 610 generates, for example, a gamma voltage control signal GVCS, a gate control signal GCS, a data control signal DCS and a power control signal VCS based on the control signal CS, and provides the gamma voltage control signal GVCS, the gate control signal GCS, the data control signal DCS and the power control signal VCS to the gamma voltage generating part 630, the gate driver 620, the data driver 640 and the power generating part 650.

The power generating part 650 generates, for example, a gate driving voltage GDV, a data driving voltage AVDD and the first and second common voltages CV1 and CV2, and provides the gate driving voltage GDV, the data driving voltage AVDD and the first and second common voltages CV1 and CV2 to the gate driver 620, the gamma voltage generating part 620 and the common electrode CE1, respectively.

The first common voltage CV1 is provided to the first bar BP1 of the common electrode CE1, and the second common voltage CV2 is provided to the second bar BP2 of the common electrode CE1. The common voltage CV1 and the second common voltage CV2 have, for example, levels different from each other.

For example, the second common voltage CV2 may have a larger level than that of the first common voltage CV1. Thus, the voltage differences between the common electrode CE1 and the first pixel part PX1 to the n-th pixel part PXn may increase from a first pixel part PX1 connected to the first gate line GL1 to an n-th pixel part PXn connected to the n-th gate line GLn. Thus, the brightness from the first pixel part PX1 to the n-th pixel part PXn can increase, so that the brightness reduced by the reset voltage from the first pixel part PX1 to the n-th pixel part PXn may be compensated.

When the second common voltage CV2 has a level larger than that of the first common voltage CV1, the voltage difference between the common electrode CE1 and the n-th pixel part PXn is larger than about 0V, though a data voltage displaying the black grayscale is applied to the n-th pixel part PXn. However, a threshold value of the voltage difference between the common electrode CE1 and the n-th pixel part PXn is about 5V to display the black grayscale, and thus the voltage difference between the first common voltage CV1 and the second common voltage CV2 should be less than about 5V.

The gate driver 620 provides the first to the n-th gate on voltages and the first to the n-th reset voltages to the first to the n-th gate lines GL1, . . . , GLn, during a frame.

According to the present example embodiment, the first and second common voltages different from each other are provided to the first and second edges and of the common electrode CE1, respectively, so that the voltage of the common electrode CE1 may be substantially linearly changed from the first edge to the second edge. Thus, the electro-wetting display panel 100 may uniformly display the brightness.

According to example embodiments of the present invention, grayscales for an image data from a first gate line to an n-th gate line may substantially linearly increase, so that the electro-wetting display panel may uniformly display the brightness.

A power generating part may provide data driving voltages different from each other to a gamma voltage generating part at every horizontal period, so that a back-flow may be prevented, a driving frequency may not increase, and an upper side and a lower side of the electro-wetting display panel may uniformly display the brightness.

In addition, data voltages based on compensated data compensating an image data at every horizontal period may be provided, so that a back-flow may be prevented, a driving frequency may not increase, and an upper side and a lower side of the electro-wetting display panel may uniformly display the brightness.

In addition, first to n-th gate lines can be alternately driven in a first direction and in a second direction opposite to the first direction, so that the electro-wetting display panel may uniformly display the brightness.

Having described example embodiments of the present invention, it is further noted that it is readily apparent to those of reasonable skill in the art that various modifications may be made without departing from the spirit and scope of the invention which is defined by the metes and bounds of the appended claims.

What is claimed is:

1. A method for driving an electro-wetting display panel including a pixel part, the method comprising:
   applying data voltages to the electro-wetting display panel during a first time of a frame, the frame including the first time and a second time, the first time having a plurality of horizontal periods, wherein the data voltages are generated based on reference gamma voltages, and wherein at least one of the reference gamma voltages of one of the horizontal periods is different from another of the reference gamma voltages of another of the horizontal periods; and
   applying a reset voltage to the electro-wetting display panel during the second time of the frame.

2. The method of claim 1, wherein the applying of the data voltages comprises:
   receiving driving voltages to generate the reference gamma voltages, wherein the driving voltages of the horizontal periods are different from each other; and
   applying the data voltages to the pixel part based on image data and the reference gamma voltages.

3. The method of claim 2, wherein the plurality of horizontal periods includes a first horizontal period to an n-th horizontal period, and wherein the reference gamma voltages are generated by:
   receiving a first driving voltage to an n-th driving voltage during the first to n-th horizontal periods, respectively, the first to n-th horizontal periods corresponding to a first gate line to an n-th gate line, respectively.

4. The method of claim 3, wherein a voltage difference between a common voltage and the first to n-th driving voltages increases from the first to the n-th horizontal periods.

5. The method of claim 1, wherein the first time is n times longer than the second time ('n' is an integer number which is no less than 2).

6. A method for driving an electro-wetting display panel including a pixel part, the method comprising:
   compensating image data based on gamma curves which are different from each other to generate compensated data at each horizontal period;
   applying data voltages to the electro-wetting display panel based on the compensated data during a first time of a frame, wherein the frame includes the first time and a second time; and
   applying a reset voltage to the electro-wetting display panel during the second time of the frame.

7. The method of claim 6, wherein the compensated data is generated by:
   using a first look-up table to an n-th look-up table, the first to n-th look-up tables corresponding to a first horizontal period to an n-th horizontal period, respectively,
   wherein the first to n-th horizontal periods correspond to a first gate line to an n-th gate line, respectively, and
   wherein brightness corresponding to the first to n-th look-up tables storing the compensated data increases from the first to the n-th look-up tables.

8. The method of claim 7, wherein the first look-up table corresponds to an original gamma curve of the image data, and wherein the brightness corresponding to the second to n-th look-up tables corresponding to the gamma curves is higher than the brightness of the original gamma curve, and the brightness corresponding to the second to n-th look-up tables substantially linearly increases from the second to the n-th look-up tables.

9. A method for driving an electro-wetting display panel including a plurality of pixel parts controlling light transmittance by controlling movement of a fluid in each pixel part, the method comprising:
   sequentially applying data voltages to a first gate line to an n-th gate line of the electro-wetting display panel in a first direction;
   sequentially applying the data voltages to a first pixel part to an n-th pixel part through the first to n-th gate lines during a first time of a frame, the first to n-th gate lines are arranged in a first direction, the frame having the first time, a second time, a third time and a fourth time, the first time having a plurality of periods, the first to n-th pixel parts are connected to the first to n-th gate lines, respectively;

sequentially applying reset voltages to the first to n-th gate lines in the first direction; sequentially applying the reset voltages to the first to n-th pixel parts during the second time of the frame;

sequentially applying the data voltages to the first to n-th gate lines in a second direction opposite to the first direction;

sequentially applying the data voltages to the n-th to first pixel parts during the third time of the frame;

sequentially applying the reset voltages to the first to n-th gate lines in the second direction; and sequentially applying the reset voltages to the n-th to first pixel parts during the fourth time of the frame.

10. The method of claim 9, wherein the first time is n times longer than the second time, and the third time is n times longer than the fourth time, wherein 'n' is an integer number which is no less than 3.

11. An electro-wetting display apparatus comprising:

an electro-wetting display panel configured to display an image, the electro-wetting display panel comprising a pixel part including a pixel electrode, a common electrode facing the pixel electrode and a fluidic layer disposed between the pixel electrode and the common electrode, the fluidic layer configured to control light transmittance of the pixel part; and a driving part configured to apply data voltages to the electro-wetting display panel during a plurality of horizontal periods of a first time of a frame and configured to apply a reset voltage to the electro-wetting display panel during a second time of the frame.

12. The electro-wetting display apparatus of claim 11, wherein the driving part comprises:

a timing controlling part configured to receive image data from outside of the electro-wetting display apparatus;

a power generating part configured to generate driving voltages at each horizontal period, wherein voltage differences between the common electrode and the driving voltages are different from each other in each of the horizontal periods;

a gamma voltage generating part configured to generate the reference gamma voltages different from each other based on the driving voltage during each horizontal period; and a data driver configured to generate a data voltage based on the image data and each of the reference gamma voltages during each horizontal period.

13. The electro-wetting display apparatus of claim 12, wherein the plurality of horizontal periods includes a first horizontal period to an n-th horizontal period, and wherein the voltage generating part is configured to generate a first driving voltage to an n-th driving voltage during the first to n-th horizontal periods, respectively, the first to n-th horizontal periods corresponding to a first gate line to an n-th gate line, respectively.

14. The electro-wetting display apparatus of claim 11, wherein the first time is n times longer than the second time, wherein 'n' is an integer number which is no less than 2.

15. An electro-wetting display apparatus comprising:

an electro-wetting display panel configured to display an image, the electro-wetting display panel comprising a pixel part including a pixel electrode, a common electrode facing the pixel electrode and a fluidic layer disposed between the pixel electrode and the common electrode, the fluidic layer configured to control light transmittance of the pixel part; and a driving part configured to compensate an image data based on gamma curves during a plurality of horizontal periods during a first time of a frame to generated compensated data, apply a data voltage to the electro-wetting display panel during the first time of the frame, and apply a reset voltage to the electrode-wetting display panel during a second time of the frame, the gamma curves of different horizontal periods being different from each other, the data voltage being generated based on the compensated data.

16. The electro-wetting display apparatus of claim 15, wherein the plurality of horizontal periods includes a first horizontal period to an n-th horizontal period, the driving part comprises a timing controlling part configured to compensate image data based on gamma curves during the first to n-th horizontal periods to generate compensated data using a first look-up table to an n-th look-up table corresponding to the first to n-th horizontal periods, respectively, the first to n-th horizontal periods corresponds to a first gate line to an n-th gate line, respectively, and brightness of the gamma curves corresponding to the compensated data stored in the first to n-th look-up tables increases as the number of the look-up tables increases from the first look-up table to the n-th look-up table.

17. The electro-wetting display apparatus of claim 16, wherein the first look-up table corresponds to an original gamma curve of the image data, and brightness corresponding to the second to n-th look-up tables corresponding to the gamma curves higher than that the brightness of the original gamma curve substantially linearly increases, and the brightness corresponding to the second to n-th look-up tables substantially linearly increases.

18. An electro-wetting display apparatus comprising:

an electro-wetting display panel configured to display an image, the electro-wetting display panel comprising a pixel part including a pixel electrode, a common electrode facing the pixel electrode and a fluidic layer disposed between the pixel electrode and the common electrode, the fluidic layer configured to control light transmittance of the pixel part; and a driving part configured to sequentially apply data voltages to first to n-th gate lines of the electro-wetting display panel in a first direction to sequentially apply the data voltages to first to n-th pixel parts through the first to n-th gate lines during a first time of a frame, the first to n-th gate lines being arranged in a first direction, the frame having the first time, a second time, a third time and a fourth time, the first time having a plurality of periods, the first to n-th pixel parts being connected to the first to n-th gate lines, respectively, the driving part further configured to sequentially apply reset voltages to the first to n-th gate lines in the first direction to sequentially apply the reset voltages to the first to n-th pixel parts during the second time of the frame, the driving part further configured to sequentially apply the data voltages to the first to n-th gate lines in a second direction opposite to the first direction to sequentially apply data voltages to the n-th to first pixel parts during the third time of the frame, and the driving part further configured to sequentially apply the reset voltages to the first to n-th gate lines in the second direction to sequentially apply the reset voltages to the n-th to first pixel parts during the fourth time of the frame.

19. The electro-wetting display apparatus of claim 18, wherein the first time is n times longer than the second time, and the third time is n times longer than the fourth time, wherein 'n' is an integer number which is no less than 3.

20. An electro-wetting display apparatus comprising:
an electro-wetting display panel comprising
  a first substrate,
  a second substrate facing the first substrate,
  a fluidic layer,
  a first conductive spacer and a second conductive spacer,
  wherein
    the first substrate includes a pixel electrode disposed in a display area configured to display an image and first and second common voltage lines disposed in a peripheral area surrounding the display area,
    the second substrate includes a common electrode facing the pixel electrode and the first and second common voltage lines,
    the fluidic layer is disposed between the pixel electrode and the common electrode,
    the fluidic layer is configured to control light transmittance of the electro-wetting display panel, and
    each of the first and second conductive spacers is disposed between the common electrode and each of the first and second common voltage lines;
a driving part configured to
  apply a first voltage and a second voltage to the first and second common voltage lines, respectively, during a first time of a frame, wherein the second voltage has a different level from the first voltage; and
  apply a reset voltage to the electro-wetting display panel during the second time of the frame.

* * * * *